March 6, 1928.
J. C. BIRD
1,661,154
VALVE MECHANISM FOR STEAM ENGINES
Filed Feb. 21, 1927     3 Sheets-Sheet 1
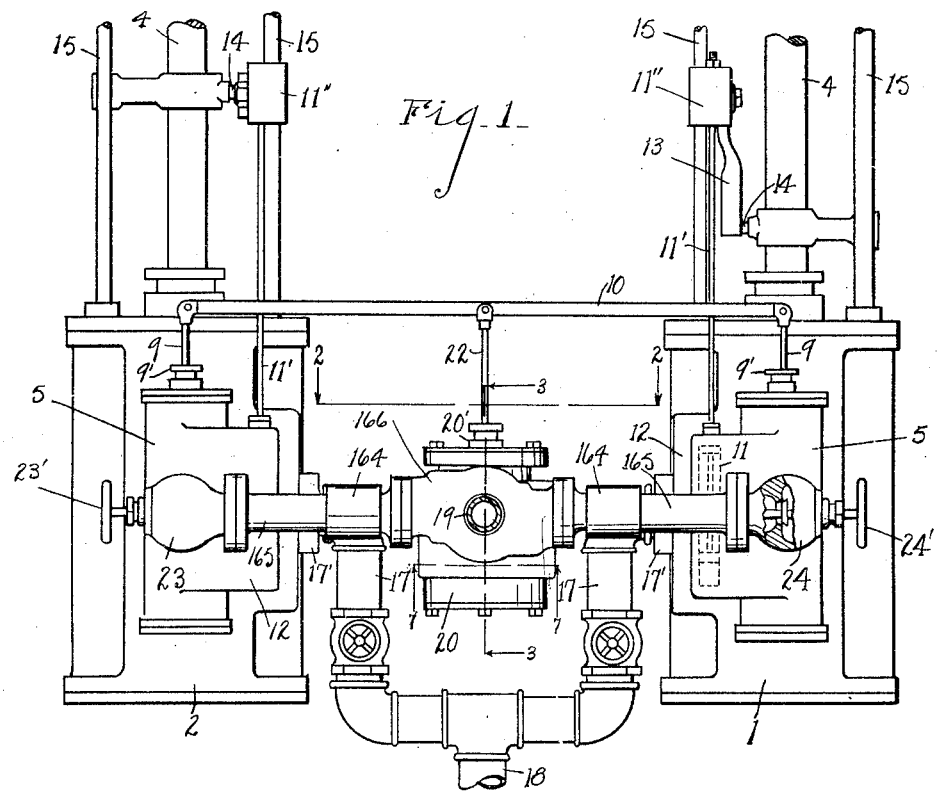
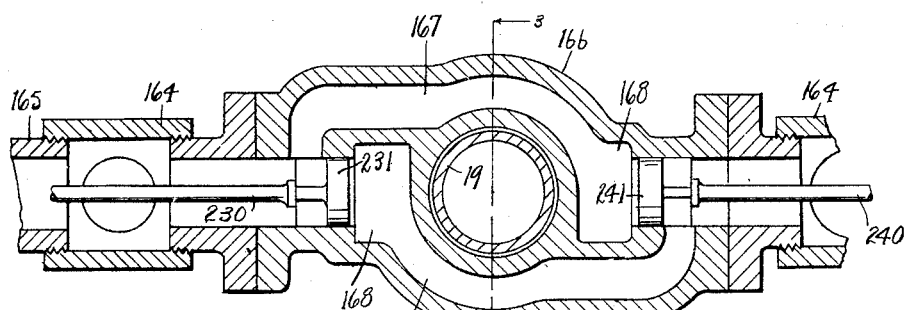
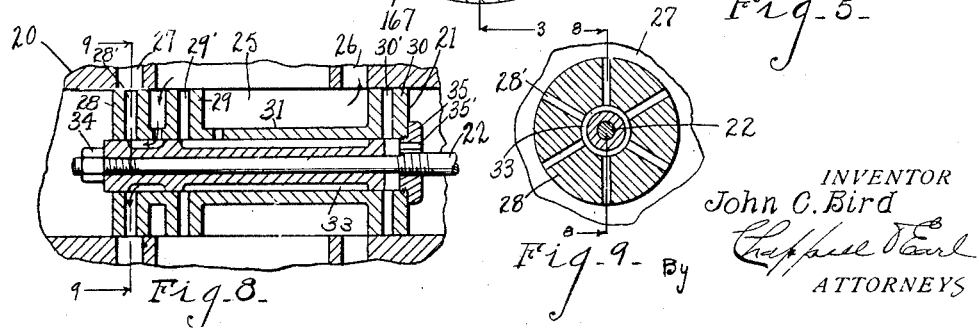
INVENTOR
John C. Bird
By Chappell & Earl
ATTORNEYS March 6, 1928.
J. C. BIRD
1,661,154
VALVE MECHANISM FOR STEAM ENGINES
Filed Feb. 21, 1927    3 Sheets-Sheet 2
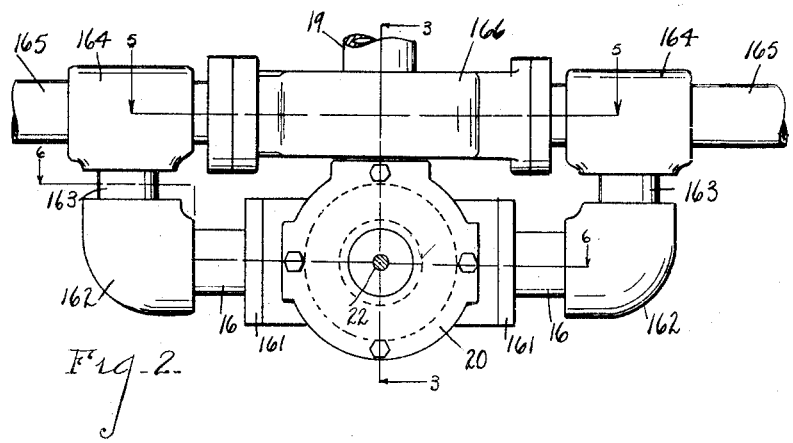
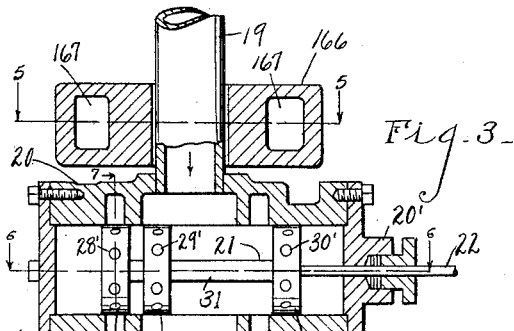
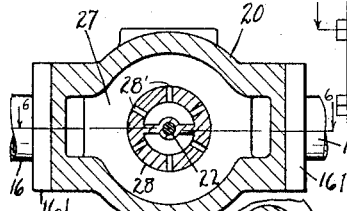
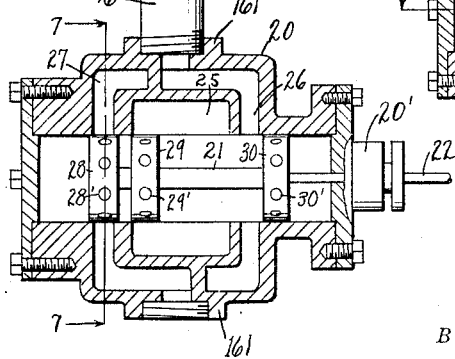
INVENTOR
John C. Bird
BY Chappell Earl
ATTORNEYS

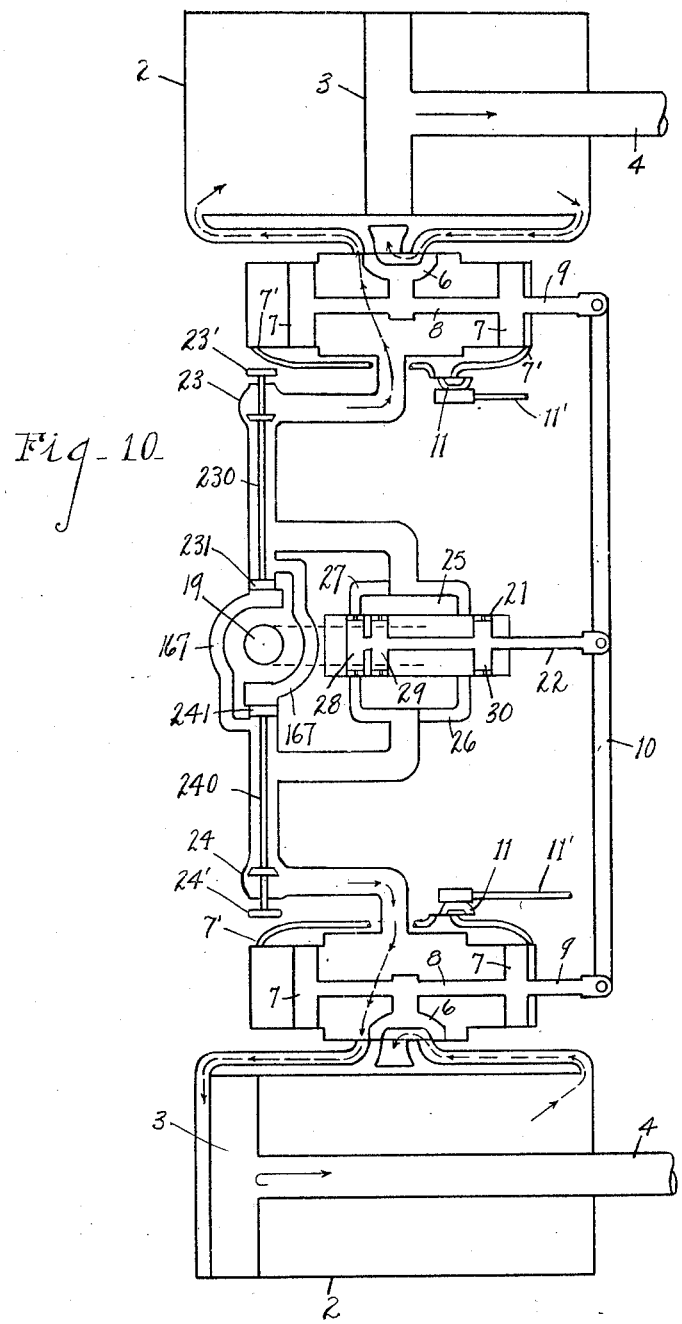

Patented Mar. 6, 1928.

1,661,154

UNITED STATES PATENT OFFICE.

JOHN C. BIRD, OF BATTLE CREEK, MICHIGAN, ASSIGNOR TO UNION STEAM PUMP COMPANY, OF BATTLE CREEK, MICHIGAN.

VALVE MECHANISM FOR STEAM ENGINES.

Application filed February 21, 1927. Serial No. 169,915.

The invention is particularly an improvement upon the synchronizing structure of my Patent No. 933,952, of September 14, 1909, for valve mechanism.

The objects of the invention are:

First, to provide improved means of cutting out and controlling one or the other of a pair of engines which are connected by my said synchronizing valve.

Second, to provide improved means for controlling the relative steam passages in my said synchronizing valve.

Objects which pertain to details and economies of construction and operation of my invention appear from the detailed description to follow. The invention is defined in the claims.

A structure which embodies the features of my invention is illustrated in the accompanying drawing forming a part of this application, in which:

Fig. 1 is a plan view of a pair of engines coupled by my improved mechanism, the cutout valve being in section and the auxiliary steam valve being dotted. The yoke bars and piston rod are shown broken off as the pump or other means on which the engine acts is not necessarily a part of my invention.

Fig. 2 is an enlarged detail sectional elevation taken on line 2—2 of Fig. 1, showing details of my improved synchronizing valve and cut-out means.

Fig. 3 is an enlarged detail vertical sectional elevation taken on line 3—3 of Figs. 1, 2 and 5, showing the valve 21 to the right.

Fig. 4 is a detail section through the valve part on the same section as Fig. 3, showing the synchronizing valve 21 in central position.

Fig. 5 is a detail horizontal sectional view taken on line 5—5 of Figs. 2 and 3.

Fig. 6 is an enlarged detail horizontal sectional plan view taken on line 6—6 of Figs. 2, 3, 4 and 7.

Fig. 7 is a detail sectional elevation taken on line 7—7 of Figs. 1, 3, 4 and 6.

Fig. 8 is an enlarged detail longitudinal sectional elevation taken on line 8—8 of Fig. 9 through the valve, showing the adjusting means for regulating the side of port in the synchronizing valve.

Fig. 9 is a detail transverse sectional view of the same on line 9—9 of Fig. 8.

Fig. 10 is a detail diagrammatic view showing the steam circulation and control.

The parts are identified by their numerals of reference which are the same in all the views.

1 and 2 are a pair of engines connected and controlled by my improved synchronizing valve mechanism. 3 (see Fig. 10) is the piston of each engine. 4 is the piston rod extending through suitable stuffing box and connected to a pump or other driven part, the engine being especially adapted for use on pumps and direct work. 5 is the steam chest on each engine provided with a steam actuated valve 6. 7 is the steam actuated piston in short cylinders 7' at each end to control the engine valve 6 (see Fig. 10).

A rod or stem 8 connects the two pistons 7 together and couples them to said D slide valve 6, of usual construction for engines. 9 is the piston rod extending through stuffing box 9' at the end of each steam chest 5, so that the piston 7' therein, besides controlling the valve, acts as an engine through the rod 9 to control or act upon the synchronizing lever bar 10, this action upon the synchronizing lever bar 10 being the means of controlling the synchronizing valve.

An auxiliary engine valve 11 with connecting rod 11' is disposed in the auxiliary steam chest 12 and controls the admission of steam to the short cylinders 7' to actuate the pistons 7 in the same manner that the piston of a steam engine is controlled (see details diagrammatically indicated in Fig. 10). The rod 11' connects to slide support 11" and is controlled by lever 13 engaged by pin 14 on the piston rod 4 in the manner described in my former patent. This is a common form of valve control means. This valve mechanism is identical on the two steam cylinders 1 and 2. 15, 15 are yoke rods.

My improved synchronizing valve is midway between the engines 1 and 2 and is embraced within the casing 20, which receives steam through the vertical pipe 19 and delivers to the engine through identical pipes 16 coupled to boss 161 and by fittings 162, 163, 164, 165 to deliver to the engines 1 or 2 at each side.

Within the valve chamber 20 is a piston valve 21 controlled by a rod 22 which extends through the stuffing box 20' on the end thereof and connects to the synchronizing lever bar 10 at a central position, whereby the said valve is controlled by said lever bar 10 in a manner hereafter to be indicated. The valve casing 20 for piston valve 21 has a central annular chamber 25 which is supplied through the said pipe 19. Annular chambers or ports 26, 27 toward each end are controlled by the piston valve 21 for delivering steam to the connecting pipe 16 as above referred to.

The piston valve 21 is provided with piston sections 28, 29, 30 for controlling the chambers or ports 26 and 27, and each has a series of radial perforations 28', 29' 30', respectively to permit of the discharge of a restricted or limited amount of steam when the ports 26, 27 are closed by the said piston sections. This restriction of the steam is the means adapted for effectively controlling the engines, insuring that they move in step; and, if they start out of step, that they will vary their movement until they come into step. The sections 28, 29 and 30 are so spaced that the full ports may be uncovered and opened during the successive steps of the cycle of the valve movement.

The piston valve 21 and its ports are the same as that appearing in my former patent, and I have made use of the same numerals of reference in describing the same.

In certain instances it is desirable to provide the piston valve 21 with adjustable port. This is accomplished by the improved structure indicated in Figs. 8 and 9, in which the central connection 31 of the valve 21 is made tubular, the bore extending the length of the valve. The radial perforations 28', 29', 30' connect to the central bore.

The central adjustable plunger piston 33, with annular ports cut thereon, is provided for adjusting and regulating the size of the radial ports 28', 29', 30' as indicated. This central adjustable plunger piston 33 is adjustable on the end of the piston rod 22, being screw-threaded thereon and retained in place by a lock nut 34. A coupling nut 35 is provided at the end which is perforated at 35' for the admission of steam (see Fig. 8).

By this means it is clear that the cross section of the radial passages in the valve can be regulated and controlled and set for the required duty. However, it is seldom that adjustment is needed and I usually make my improved valve without this adjustment.

The rod 22 of the synchronizing valve 21 is connected to the lever bar 10 at its central position, and the actuation of the lever bar 10 is that which controls the movement of the synchronizing valve. The bar is actuated by the steam controlled engine valve on each engine, the pistons of which serve the double purpose of controlling the valve of each engine and through their connections by the piston rods 9 actuating the lever 10, and thereby actuating the synchronizing valve. This control is all accomplished as indicated in my former patent.

I provide an improved by-pass structure to overcome the defects of the three way valve shown in my former patent. This is operated in connection with the cut-off valve for cutting off the steam supply to either engine cylinder. The cut-off valves 23, 24 are identical and controlled by the usual hand wheel 23', 24' (see detail of the valve in Fig. 1). The cut-off valve is supplied with a stem 240 extending inwardly and connecting to a plug valve 241 and the valve 23 is provided with a stem 230 connecting with a plug valve 231 precisely similar.

When either cut-off valve is closed, the operation of the corresponding plug valve by-passes the steam supply past the synchronizing valve. This by-pass valve structure is contained in casing 166 which embraces and is partially supported by supply pipe 19. There are within the casing 166 exactly symmetrical passages 167 terminating in chambers 168. Considering that at the right hand of Fig. 5, it will be seen that when the valve 24 is closed, the plug valve 241 will be moved into the chamber 168 to permit free communication between the two passages referred to, making a complete connection or by-pass around the synchronizing valve. On the other hand, if the valve 23 is closed the plug valve 231 will move into the corresponding chamber 168 and the corresponding by-pass passages 167 will be connected and the steam freely by-pass the synchronizing valve 21. Therefore, when either engine is cut off, the synchronizing valve is at the same time by-passed and the engine that is not cut off is in no way affected by the synchronizing valve but is left free to operate in the usual way under the usual valve control.

I have shown these valve controls diagrammatically in Fig. 10, from which diagram the operation will be very clear, being the same as described in my former patent where the steps are detailed in full. This detailing of operation is not necessary here to understand the by-pass structure.

Having thus described my invention what I claim as new and desire to secure by Letters Patent is:

1. In a synchronizing valve structure, the combination of a plurality of engines with piston valves, a synchronizing valve connected to be operated by the pistons of said piston valves, a cut-off valve for cutting off one or the other of said cylinders, and a by-pass with valve connected to be opened when the cut-off valve is closed to by-pass the synchronizing valve when an engine is cut off.

2. In a synchronizing valve structure, the combination of a plurality of engines with piston valves, a synchronizing valve connected to be operated by the pistons of said piston valves, a cut-off valve for cutting off one or the other of said cylinders, a casing with by-pass passage therethrough, and a plug valve with stem connected to the cut-off valve to be opened when the cut-off valve is closed.

3. The combination with a plurality of engines and engine cylinders with piston valves for controlling the direct action of the same and with auxiliary valves for admitting steam to the piston valves, a synchronizing valve controlled by an equalizing lever connected to the piston rods of said piston valves and provided with restricted passages in the ports to control the first half of the action of each cylinder, a cut-off valve for each engine, and a plural by-pass structure extending around the said synchronizing valve with a plug valve in each connected to each of said cut-off valves respectively for opening a by-pass of the synchronizing valve when an engine is cut off, coacting as specified.

4. The combination with a plurality of engines and engine cylinders with piston valves for controlling direct action of same and with auxiliary valve for admitting steam to piston valves, a piston synchronizing valve with piston sections having restricted radial ports, and an adjustable central ported plug for controlling the said ports, an equalizing lever connected to piston rods of said piston valves for controlling same to synchronize the said engine cylinders, as specified.

In witness whereof I have hereunto set my hand.

JOHN C. BIRD.